US010966371B2

(12) United States Patent
Ricketts

(10) Patent No.: US 10,966,371 B2
(45) Date of Patent: Apr. 6, 2021

(54) CLEANING SYSTEM FOR A COMBINE

(71) Applicant: CNH Industrial America LLC, New Holland, PA (US)

(72) Inventor: Jonathan Eugene Ricketts, Coal Valley, IL (US)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 16/180,706

(22) Filed: Nov. 5, 2018

(65) Prior Publication Data
US 2020/0137959 A1 May 7, 2020

(51) Int. Cl.
*A01F 12/44* (2006.01)
*A01D 41/06* (2006.01)
*A01F 12/00* (2006.01)

(52) U.S. Cl.
CPC .............. *A01F 12/44* (2013.01); *A01D 41/06* (2013.01); *A01F 12/00* (2013.01); *A01F 12/444* (2013.01); *A01F 12/446* (2013.01)

(58) Field of Classification Search
CPC .. A01D 41/127; A01D 41/1243; A01D 41/06; A01F 12/00; A01F 12/444; A01F 12/446
See application file for complete search history.

(56) References Cited

U.S. PATENT DOCUMENTS

| 3,513,646 | A | * | 5/1970 | Johnston | ................. | A01F 12/18 56/14.6 |
| 3,827,443 | A | | 8/1974 | Drayer | | |
| 4,253,471 | A | | 3/1981 | Klimmer | | |
| 4,589,425 | A | * | 5/1986 | Mitchell, Jr. | ......... | A01F 12/444 460/99 |
| 5,480,353 | A | * | 1/1996 | Garza, Jr. | ............ | A01D 45/006 171/27 |
| 6,558,252 | B2 | | 5/2003 | Visagie et al. | | |
| 6,773,343 | B2 | * | 8/2004 | Grywacheski | ........ | A01F 12/444 460/100 |

(Continued)

FOREIGN PATENT DOCUMENTS

EP     3443835 A1     2/2019

OTHER PUBLICATIONS

Extended European Search Report for EP Application No. 19207254.4 dated Apr. 3, 2020 (five pages).

*Primary Examiner* — Abigail A Risic
(74) *Attorney, Agent, or Firm* — Peter Zacharias; Patrick Sheldrake

(57) ABSTRACT

A combine grain cleaning system having front and rear rollers, a conveyor belt having an upper surface extending from the front roller to the rear roller, a motor operatively connected to the conveyor belt and configured to drive the upper surface in a belt travel direction from the front roller to the rear roller, and a baffle located adjacent the rear roller. The baffle has a leading edge, a trailing edge located behind the leading edge with respect to the belt travel direction and below the leading edge with respect to a vertical direction, and a baffle surface extending from the leading edge to the trailing edge. One or more sieves are located below the baffle, and a fan is provided to direct an airflow at least partially upwards in the vertical direction adjacent the rear roller. A method for separating grain is also provided.

19 Claims, 2 Drawing Sheets

(56) References Cited

U.S. PATENT DOCUMENTS

| | | | |
|---|---|---|---|
| 7,811,161 B1* | 10/2010 | Ricketts | A01D 45/02 |
| | | | 460/23 |
| 9,629,310 B2 | 4/2017 | Bilde | |
| 9,750,193 B2* | 9/2017 | Bonte | A01F 12/446 |
| 9,814,184 B2 | 11/2017 | Ricketts et al. | |
| 2010/0110428 A1* | 5/2010 | Priesnitz | G01J 3/02 |
| | | | 356/328 |
| 2013/0017057 A1 | 1/2013 | Lagueux | |
| 2015/0009328 A1* | 1/2015 | Escher | A01D 75/00 |
| | | | 348/148 |
| 2015/0264864 A1* | 9/2015 | Branch | A01D 41/1243 |
| | | | 701/50 |
| 2016/0135372 A1 | 5/2016 | Bonte et al. | |
| 2017/0112065 A1* | 4/2017 | Reinecke | A01F 12/44 |
| 2017/0318748 A1 | 11/2017 | Bilde | |
| 2018/0352739 A1* | 12/2018 | Puryk | A01F 12/40 |
| 2019/0059218 A1* | 2/2019 | Rittershofer | A01F 29/04 |
| 2019/0124849 A1* | 5/2019 | Farley | A01F 12/40 |
| 2019/0246561 A1* | 8/2019 | Neitemeier | A01D 61/02 |
| 2020/0015417 A1* | 1/2020 | Linde | A01D 41/1276 |

* cited by examiner

US 10,966,371 B2

CLEANING SYSTEM FOR A COMBINE

BACKGROUND

Agricultural combines are machines that gather and thresh crop material to separate grain from other material. In a typical combine, a header gathers the crop material and feeds it to a thresher, and the thresher separates the grain from other material. A mixture of grain and some of the smaller remaining material (material other than grain, or "MOG") is then delivered to a cleaning system, which removes the bulk of the smaller MOG from the grain using a variety of sieves.

The majority of the grain and MOG usually falls out of the forward portion of the thresher, and the volume of this material may be too great to effectively sieve at one time. Thus, to address this large bulk of material, a typical combine has a main conveyance apparatus that collects the initial bulk of grain and MOG and distributes it in a more controlled manner to the sieves. Such apparatus can be an auger bed, a grain pan, a rattle chain, or the like. Such devices are often required to move the grain and MOG in an uphill direction to reach the sieves, which reduces the effectiveness of transport. Auger beds are more effective at moving material uphill, but they also mix the grain and MOG together, which makes downstream separation more difficult. Rattle chains are somewhat more effective than grain pans at moving material uphill, and maintain or encourage stratification of the grain and MOG, which assists with downstream separation, but still can be improved upon. Grain pans are good at moving material until the leading edge is tipped down, when its efficiency suffers as they are less capable of moving material uphill, but are advantageous in that they maintain stratification of the grain and MOG.

While such grain cleaning systems have been in use for many years, the inventor has determined that improvements and beneficial modifications can be made to the state of the art.

This description of the background is provided to assist with an understanding of the following explanations of exemplary embodiments, and is not an admission that any or all of this background information is necessarily prior art.

SUMMARY OF THE INVENTION

In one exemplary aspect, there is provided a grain cleaning system for a combine. The grain cleaning system includes a front roller, a rear roller spaced in a rearward direction from the first roller, a conveyor belt having an upper surface extending from the front roller to the rear roller, a motor operatively connected to the conveyor belt and configured to drive the upper surface in a belt travel direction from the front roller to the rear roller, and a baffle located adjacent the rear roller. The baffle has a leading edge, a trailing edge located behind the leading edge with respect to the belt travel direction and below the leading edge with respect to a vertical direction, and a baffle surface extending from the leading edge to the trailing edge. One or more sieves are located below the baffle, and a fan is configured to direct an airflow at least partially upwards in the vertical direction adjacent the rear roller.

In another exemplary aspect, there is provided a method for cleaning grain in a combine. The method includes: operating a conveyor belt to move a combination of grain and material other than grain in a belt drive direction; expelling the combination of grain and material other than grain from the conveyor belt in the belt drive direction; contacting the expelled combination of grain and material other than grain with a baffle to force the combination of grain and material other than grain to move at least partially downwards in a vertical direction; and directing an airflow at least partially upwards in the vertical direction to intersect the downwardly-directed combination of grain and material other than grain, to thereby separate at least some of the material other than grain from the grain.

In another exemplary aspect, there is provided a combine having a threshing and separating system and a header configured to direct crops into the threshing and separating system. The threshing and separating system includes a grain cleaning system. The grain cleaning system includes a front roller, a rear roller spaced in a rearward direction from the first roller, a conveyor belt having an upper surface extending from the front roller to the rear roller, a motor operatively connected to the conveyor belt and configured to drive the upper surface in a belt travel direction from the front roller to the rear roller, and a baffle located adjacent the rear roller. The baffle has a leading edge, a trailing edge located behind the leading edge with respect to the belt travel direction and below the leading edge with respect to a vertical direction, and a baffle surface extending from the leading edge to the trailing edge. One or more sieves are located below the baffle, and a fan is configured to direct an airflow at least partially upwards in the vertical direction adjacent the rear roller.

BRIEF DESCRIPTION OF THE DRAWINGS

Embodiments of inventions will now be described, by way of example, with reference to the accompanying drawings, in which.

In the figures, like reference numerals refer to the same or similar elements.

DETAILED DESCRIPTION OF THE DRAWINGS

Exemplary embodiments of the present invention provide mechanisms for separating grain from material other than grain ("MOG") in an agricultural combine.

The terms "grain", "straw" and "tailings" are used in this specification for convenience but it is to be understood that these terms are not intended to be limiting. "Grain" refers to that part of the crop material which is threshed and separated from the discardable part of the crop material, which is referred to as non-grain crop material, material other than grain ("MOG") or straw. Incompletely threshed crop material is referred to as "tailings."

The terms "forward", "rearward", "left" and "right", when used in connection with the agricultural harvester and/or components thereof are usually determined with reference to the direction of forward operative travel of the harvester, but they should not be construed as limiting. The terms "longitudinal" and "transverse" are determined with reference to the fore-and-aft direction of the agricultural harvester and also are not to be construed as limiting.

Figure 1:
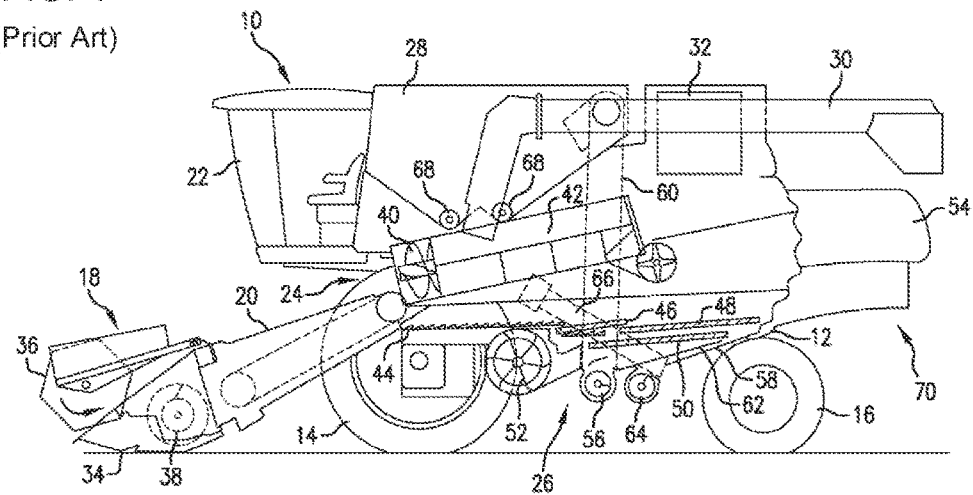
FIG. 1 illustrates an exemplary agricultural combine.

Referring now to the drawings, and more particularly to FIG. 1, there is shown an example of a known agricultural harvester in the form of a combine 10, which generally includes a chassis 12, ground engaging wheels 14 and 16, a header 18, a feeder housing 20, an operator cab 22, a threshing and separating system 24, a grain cleaning system 26, a grain tank 28, and an unloading auger 30. It should be appreciated that while the agricultural harvester is shown as a combine 10, exemplary embodiments may be used with other equipment that harvests crop material (e.g., conventional combines, rotary combines, hybrid combines, chopper harvesters, etc.).

The chassis 12 is moved along the ground on drive means, such as wheels or tracks. In the shown example, front wheels 14 are larger flotation type wheels, and rear wheels 16 are smaller steerable wheels. Motive force is selectively applied to front wheels 14 through a power plant in the form of a diesel engine 32 or the like, and a transmission (not shown). One or more of the wheels 14, 16 may be replaced by tracks, such as full tracks or halftracks, as known in the art.

The header 18 is mounted to the front of the combine 10 and includes a cutter bar 34 for severing crops from a field during forward motion of the combine 10. A rotatable reel 36 feeds the crop into the header 18, and a double auger 38 feeds the severed crop laterally inwardly from each side toward the feeder housing 20. The feeder housing 20 conveys the cut crop to the threshing and separating system 24, and is selectively vertically movable using appropriate actuators, such as hydraulic cylinders (not shown).

The threshing and separating system 24 in the shown exemplary embodiment is of the axial-flow type, which is longitudinally oriented in the chassis 12 and includes a rotor 40 at least partially enclosed by and rotatable within a corresponding perforated concave 42. The cut crops are threshed and separated by the rotation of the rotor 40 and moved in an axially rearward direction within the concave 42. Larger elements, such as stalks, leaves and the like are discharged from the rear of combine 10. Smaller elements of crop material, including grain and MOG, are discharged through perforations of concave 42. The MOG typically includes particles that are lighter than the grain, such as chaff, dust and straw, but some heavier-than-grain particles also may be included.

Grain and MOG that has been separated by the rotor 40 and the perforated concaves 42 falls onto a main conveyance apparatus 44, which conveys the material toward the grain cleaning system 26. The grain cleaning system 26 may include an optional pre-cleaning sieve 46, an upper sieve 48 (also known as a chaffer sieve), a lower sieve 50 (also known as a shoe sieve), and a cleaning fan 52. Grain on sieves 46, 48 and 50 is subjected to a cleaning action by fan 52, which provides airflow through the sieves to remove chaff and other impurities such as dust from the grain, by making this material airborne for discharge from a straw hood 54 located at the back of the combine 10.

The main conveyance apparatus 44 and pre-cleaning sieve 46 may oscillate or reciprocate in a fore-to-aft manner to transport the grain and finer MOG to the upper surface of the upper sieve 48. The upper sieve 48 and the lower sieve 50 are vertically arranged relative to each other, and likewise may oscillate in a fore-to-aft manner to spread the grain across sieves 48, 50, while permitting the passage of cleaned grain by gravity through the openings of sieves 48, 50. The main conveyance apparatus 44 may be a grain pan, as illustrated, or it may be an auger bed, conveyor belt or other device for passing material towards its rearward end.

Clean grain falls to a clean grain auger 56 positioned crosswise below and in front of the lower sieve 50. The clean grain auger 56 receives clean grain from each sieve 48, 50 and from a bottom pan 62 of the grain cleaning system 26. The clean grain auger 56 conveys the clean grain laterally to a generally vertically arranged elevator 60, which can also be referred to as a grain elevator, for transport to the grain tank 28.

Tailings from the grain cleaning system 26 that fall down to a lower bottom pan 58 move to a tailings auger 64. The tailings are transported via tailings auger 64 and a return auger 66 to the upstream end of the grain cleaning system 26 for repeated cleaning action.

A pair of grain tank augers 68 at the bottom of the grain tank 28 convey the clean grain laterally within the grain tank 28 to the unloading auger 30 for discharge from the combine 10. The non-grain crop material proceeds through a residue handling system 70. Residue handling system 70 may include a chopper, counter knives, a windrow door, a residue spreader, and other features known in the art.

Figure 2:
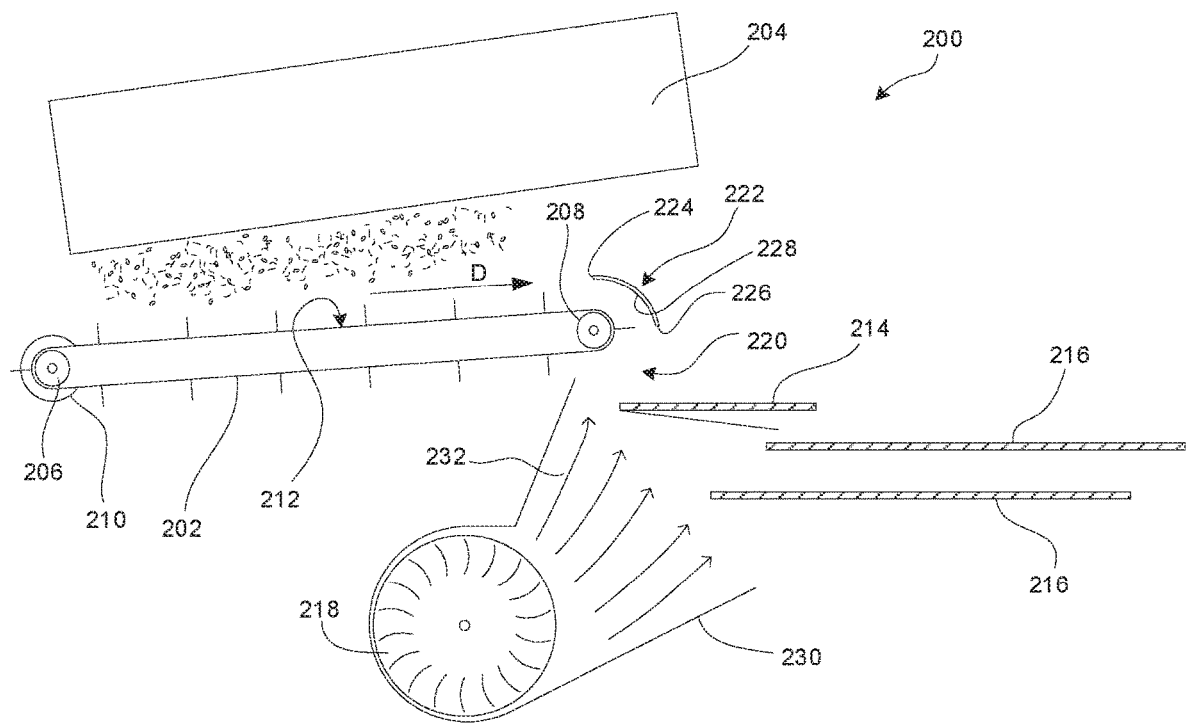
FIG. 2 is a schematic side elevation view illustrating various features of an exemplary cleaning system for an agricultural combine having a conveyor belt and a baffle.

Referring now to FIG. 2, an exemplary embodiment of the invention provides an agricultural combine grain cleaning system 200 having a main conveyance apparatus in the form of a conveyor belt 202. The conveyor belt 202 is positioned below a threshing and separating system 204, which may be of any type, such as an axial-flow type or the like. The conveyor belt 202 has an upper surface 212 that extends between a front roller 206 and a rear roller 208, and a motor 210 is operatively connected to the conveyor belt 202. The motor 210 is configured to drive an upper surface 212 of the conveyor belt 202 (i.e., the surface facing the threshing and separating system 204) towards the rear roller 208. The upper surface 212 thus defines the belt travel direction D of the conveyor belt 202.

It will be understood that the front and rear rollers 206, 208 are spaced from one another, but they may be oriented in any desirable configuration relative to the rest of the machine. For example, the front roller 206 may be in front of or behind the rear roller 208 relative to the vehicle travel direction, or they may be oriented transversely relative to the vehicle travel direction. The motor 210 may be operatively connected via belts, chains, gears or other mechanisms to drive either or both of the two rollers 206, 208.

The grain cleaning system 200 also includes one or more sieves. The sieves may include, for example, an upper sieve 214 (e.g., a pre-cleaning sieve) located immediately adjacent the rear roller 208, and one or more lower sieves 216 (e.g., a chaffer sieve and a shoe sleeve below the chaffer sieve) located, at least in part, below (i.e., lower than in the gravitational direction) the upper sieve 214. The design of such sieves 214, 216, is known in the art, and details thereof are not necessary herein.

One or more fans 218 and associated air ducts 230 are provided to direct an airflow 232 upwards into a space 220 between the conveyor belt 202 and the sieves 214, 216. The airflow 232 may pass directly vertically, but more desirably is vectored to move both vertically and rearwardly (i.e., along the belt direction D). The airflow 232 also may be directed towards the lower sides of one of more of the sieves 214, 216, as known in the art. The sieves 214, 216 are configured to allow grain to pass while blocking the passage of various sizes of MOG particles. The design of such fans 218 and ducts 230 is known in the art, and details thereof are not necessary herein.

A baffle 222 is located adjacent to the rear roller 208. The baffle 222 has a leading edge 224, a trailing edge 226 and a baffle surface 228 extending between the leading edge 224 and the trailing edge 226. The leading edge 224 is located in front of the trailing edge 226, as viewed along the belt travel direction D. The leading edge 224 is also located above the trailing edge 226 in relation to the vertical (i.e., gravitational) direction when the system 200 is in use. Thus, the baffle 222 is angled downward in a rearward direction. The baffle surface 228 may be formed from a single panel of material (e.g., a flat or bent fiberglass or metal plate), or a collection of panels that are attached together to extend from the leading edge 224 to the trailing edge 226.

The purpose of the baffle 222 is to direct grain and MOG downwards as it is ejected from the conveyor belt 202. To this end, the baffle surface 228 may comprise a smooth and continuous surface that forms a concave shape facing the conveyor belt 202. This construction is expected to effectively redirect the movement of the grain and MOG, while minimizing friction that might damage the grain and reducing the likelihood that the grain or MOG will become trapped or accumulated on the baffle 222. However, this particular shape and construction is not strictly necessary. For example, the baffle surface 228 may comprise a perforated screen or mesh, or it may be flat or convex rather than concave. The baffle surface 228 also may comprise a compound structure formed by adjacent panels of material, such as curved surfaces that are placed edge-to-edge or that overlap one another with or without a gap between them. Other variations are expected to be possible and will be understood through routine practice and modification of the examples discussed herein.

The combination of the conveyor belt 202 and the baffle 222 is expected to provide an advantage to the grain cleaning process. In particular, a conventional main conveyance apparatus (whether it be a grain pan, a conveyor belt or other structure) typically is operated in conjunction with the separating fan to attempt to separate the MOG from the grain in an effective and efficient manner. In such systems, the grain and MOG fall under the influence of gravity towards the sieves, and thus the airflow is regulated to allow the grain to fall while lifting the MOG away. Such airflow must be limited to prevent it from removing the grain along with the MOG, and such limited airflow can be less effective at separating the MOG from the grain. Thus, a relatively large proportion of MOG is not separated from the grain at the outlet of the main conveyance apparatus, and further MOG leaning operations must attempt to make up for this deficiency.

The combination of the conveyor belt 202 and the baffle 222 is expected to increase the MOG separation efficiency at the outlet of the main conveyance apparatus. In particular, the conveyor belt 202 can be operated at a relatively high speed so that the grain and MOG strike the baffle 222 and are forcefully deflected in the downwards direction. This acceleration adds to the normal gravitational acceleration, and so the grain and MOG have a higher downward velocity than they would attain under the influence of gravity alone. This increased downward velocity allows the airflow to be increased to help separate the relatively light MOG, without causing the grain to also be lifted away from the sieves.

Figure 3:
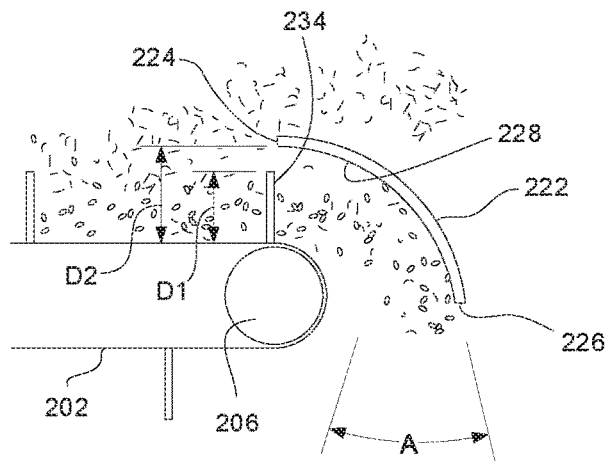
FIG. 3 is an enlarged view of the downstream end of the conveyor belt and the baffle of FIG. 2.

Referring now to FIG. 3, it is expected that the shape and position of the baffle 222 can be modified to alter the efficiency of separating grain from MOG at the outlet of the conveyor belt 202. The mass of the grain, the velocity of the belt, and the shape of the baffle can all affect how the grain is redistributed after striking and bouncing off of the baffle 222. In the shown example, the baffle 222 has a concave baffle surface 228 that has an approximately cylindrical shape with a center of rotation approximately aligned with the rotation axis of the rear roller 208. This shape is expected to direct the majority of the grain generally in a pattern spanning a distribution angle A. The orientation and size of the distribution angle A can be modified by moving the positions of the leading edge 224 and trailing edge 226, and changing the shape of the baffle surface 228. For example, moving the trailing edge 226 upwards or making it closer to the leading edge 224 can enlarge and/or redirect the distribution angle to be more in line with the belt travel direction D. As another example, changing the baffle surface 228 to have a parabolic shape can narrow the distribution angle A, whereas making the baffle surface 228 less concave can widen the distribution angle A. Other alternatives and variations will be apparent to persons of ordinary skill in the art in view of the present disclosure.

As noted above, the conveyor belt 202 moves the grain and MOG along the belt travel direction D. Depending on the type of threshing and separating system 204 and other variables, such as the frictional contact between the conveyor belt 202 and the grain and MOG, the grain and MOG may assume a particular distribution on the conveyor belt 202. For example, in axial flow systems, a relatively large proportion of the grain might be ejected from the earlier portions of the threshing and separating system 204, whereas MOG might be mostly ejected later along the threshing and separating system 204. In such cases, a relatively large proportion of the grain will fall onto the upstream end of the upper surface 212 of the conveyor belt 202 (i.e., the end closest to the front roller 206), while the MOG will fall primarily onto the downstream end of the upper surface 212 of the conveyor belt 202. This can lead to significant stratification of the grain and MOG, with the grain being generally below the MOG. The position and shape of the baffle 222 may be adjusted to account for and take advantage of such grain/MOG distribution patterns. For example, where there is significant stratification, a relatively predictable amount of grain will be located within a certain distance from the belt's surface, while the MOG will mostly be outside that distance. Thus, the leading edge 224 of the baffle 222 can be positioned to divide the flow of grain and MOG at or near this distance, thus forcing the bulk of the MOG to pass over the baffle while the majority of the grain passes below the baffle.

It is expected that the efficiency of grain separation and the orientation and size of the distribution angle A also can be modified by providing the conveyor belt 202 with one or more paddles 234 that extend outwards from the outer surface of the conveyor belt 202. The exemplary illustrated paddles 234 are flat plates that extend perpendicularly from the belt's outer surface, but they may be angled relative to the surface. The paddles 234 also may be curved, such as by having a concave or convex surface facing the belt travel direction D. The paddles 234 also may extend parallel to the width of the conveyor belt 202 (into the page in the illustrations), or they may be skewed or provided in a herringbone shape relative to the width of the conveyor belt 202. The paddles 234 also may comprise rounded bumps formed on the surface of the conveyor belt 202 or other shapes.

The paddles 234 provide surfaces to push the grain and MOG along the belt travel direction D. Thus, the grain and MOG can be conveyed by a force other than simple frictional contact with the belt's surface. Consequently, the paddles 234 are expected to allow the conveyor belt 202 to be operated at even higher speeds along the belt travel direction D to move the grain and MOG into contact with the baffle 222. Furthermore, as the paddles 234 travel around the rear roller 208 they can impart a downward force to push the grain and MOG downward into the oncoming airflow 232, which is expected to help separation efficiency.

In order to prevent unwanted friction and potential damage to the parts, the paddles 234 may be spaced from the baffle 222 so that they do not contact the baffle 222 during operation of the conveyor belt 202. For example, the paddles 234 may extend a first distance D1 from the outer surface of the conveyor belt 202, while the baffle 222 is located (at the nearest point of the baffle 222) a second distance D2 from the outer surface of the conveyor belt 202, with the second distance D2 being greater than the first distance D1. However, it is also expected that reducing or minimizing the distance between the paddles 234 and baffle 202 can be beneficial to more effectively impart a downward force on the mixture of grain and MOG as the paddles 234 travel around the rear roller 208. To this end, the first distance D1 may be between 50% and 95% of the second distance D2, or more desirably be between 65% and 85% of the second distance D2. For example, the first distance D1 may be 3 inches, and the second distance D2 may be 4 inches (i.e., the first distance D1 is 75% of the second distance D2). The difference in size may also be selected to help minimize the likelihood of MOG and larger tailings from being trapped between the leading edge 224 of the baffle 222 and the tips of the paddles 234, which can lead to undue frictional resistance.

In other exemplary embodiments, the paddles 234 may be dimensioned to intentionally contact the baffle 222. This is expected to increase and perhaps maximize the impartation of a downward force on the grain and MOG. In such case, the paddles 234 or baffle 222 may comprise a resilient or low-friction material to minimize friction between them.

Figure 4:
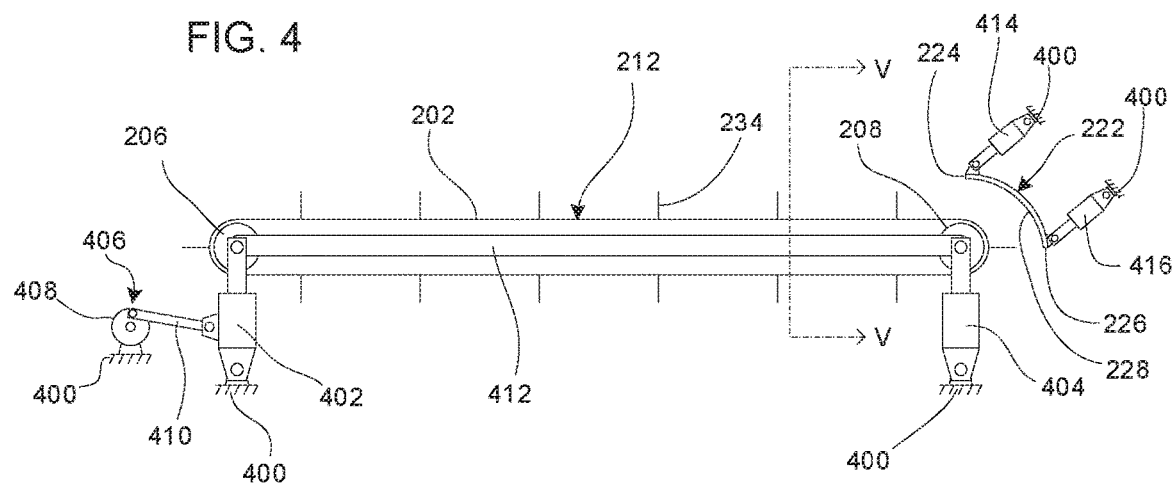
FIG. 4 is a schematic side elevation view of the conveyor belt and baffle of FIG. 2, showing exemplary mechanisms for moving the conveyor belt and baffle relative to the combine chassis.
Figure 5:
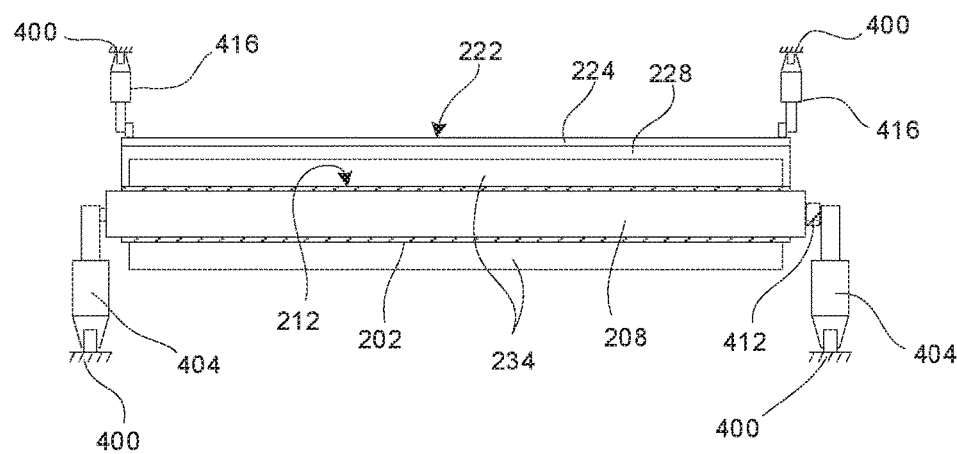
FIG. 5 is a schematic front elevation view of the conveyor belt and baffle of FIG. 5, shown along line V-V of FIG. 5.

Referring now to FIGS. 4 and 5, the conveyor belt 202 and/or the baffle 222 may be movably mounted to the combine. Such movability may be useful to tune the operation of the system to particular crop conditions or crop types, and to address movement of the combine over uneven terrain. In the shown example, the conveyor belt 202 is movably mounted to the combine frame or chassis 400 by a first belt actuator 402 and a second belt actuator 404. The first belt actuator 402 interconnects the front roller 206 and the chassis 400, and comprises one or more hydraulic pistons that can be operated using a conventional pressurized hydraulic system to extend and contract, thereby moving the front roller 204 up and down relative to the chassis 400. Similarly, the rear belt actuator 404 comprises one or more hydraulic pistons that connect the rear roller 208 to the chassis 400, and can be operated to extend and contract, thereby moving the rear roller 206 up and down relative to the chassis 400. In the shown example, each belt actuator 402, 404 comprises two hydraulic pistons, with one being connected via a spherical ball joint or the like to each end of the respective roller 206, 208, such as shown in FIG. 5. Thus, each belt actuator 402, 404 can lift the lateral sides of the respective roller 206, 208.

It will be appreciated that the belt actuators 402, 404 can be operated to tilt the conveyor belt 202 and thus change the vector orientation of the belt travel direction D. Moving the front or rear roller 206, 208 up or down can be useful to account for pitch changes as the combine drives up and down hills. It is also expected that raising the rear roller 208 will allow the grain and MOG to fall a greater distance through the upcoming airflow 232, which provides additional time to blow MOG out of the grain. Similarly, each belt actuator 402, 404 can be operated to lift one lateral side of the conveyor belt 202 relative to the other lateral side to help level the conveyor belt 202 as the combine traverses along the side of a hill. The orientation of the conveyor belt 202 also may be adjusted to address crop types and conditions, and other operating variables.

While the belt actuators 402, 404 are shown as hydraulic pistons, other mechanisms may be used. For example, one or both of the belt actuators 402, 404 may be replaced by an electrically driven piston, such as a screw jack type linear actuator that is operated by an electric motor. The rollers 206, 208 also may be connected to the chassis 400 by mechanisms other than telescoping links. For example, each roller 206, 208 may be connected on a sliding track that extends along the chassis 400, or may be connected to the chassis 400 by a respective rotating link. In such case, the movement of the rollers 206 may be controlled by one or more electric, hydraulic or pneumatic motors, or the like. It will also be understood that one of the rollers 206, 208 may be fixed in place while the other is movable to provide adjustments, or both may be fixed in place. Other alternatives and variations will be apparent to persons of ordinary skill in the art in view of the present disclosure.

In the example of FIGS. 4 and 5, the conveyor belt 202 also may be connected to a vibrator 406. The vibrator 406 is configured to vibrate all or a portion of the conveyor belt 202 in one or more directions, which might help stratify or move the grain and MOG. In the shown example, the vibrator 406 comprises a rotating balance wheel 408 that is operated by a motor (not shown). The balance wheel 408 is mounted on the chassis 400, and connected to the first belt actuator 402 by a connecting rod 410. The connecting rod 410 is connected to the balance wheel 408 at a location offset from the balance wheel's rotation axis, such that rotating the balance wheel 408 causes the connecting rod 410 to reciprocate, thereby moving the first belt actuator 402 back and forth. This movement is conveyed to the front roller 206 by the first belt actuator 402, and to the rear roller 208 by a link 412. It will be appreciated that the vibrator 406 may comprise other mechanisms and structures. For example, the first and second belt actuators 402, 404 may be mounted on a platform, and the platform may be vibrated by operating a motor to drive an offset weight in a circular path. The balance wheel 408 and connecting rod 410 also may be replaced by a mechanism such as a hydraulic or pneumatic piston, or the like. Other alternatives and variations will be apparent to persons of ordinary skill in the art in view of the present disclosure.

It is also envisioned that the baffle 222 may be movable relative to the chassis 400. In one example, the baffle 222 is rigidly mounted to the conveyor belt assembly (e.g., to link 412), so that it moves in unison with the conveyor belt 202. In the shown example, the baffle 222 is movably mounted to the chassis 400 separately from the conveyor belt 202. For example, the baffle 222 may be mounted to the chassis 400 by front baffle actuators 414 at the leading edge 224, and rear baffle actuators 416 at the trailing edge 226. Operation of the front and rear baffle actuators 414, 416 can move the leading edge 224 and/or the trailing edge 228 up and down in the vertical direction. This may be helpful to accommodate movement of the conveyor belt 202 during movement over undulating terrain, or to tune the operation of the combine to address crop types or crop conditions. It is also envisioned that the baffle actuators 414, 416 may be operated to tilt one lateral side of the baffle 222 relative to the other lateral side, to adjust the baffle 222 in correspondence with tilting the conveyor belt 202 during movement along hill sides. In some embodiments, the baffle actuators 414, 416 also may be operated to move the baffle surface 228 towards and away from the conveyor belt 202, which also may be helpful to tune the operation of the combine to particular crops types or crop conditions.

The shown baffle actuators 414, 416 comprise hydraulic pistons, but other mechanisms may be used, such as electric motors, pneumatic pistons, or the like. The baffle 202 also may be operated to limit movement in certain directions. For example, the baffle 202 may be mounted on elevators that raise and lower the baffle 222 but do not allow tilting movement. As another example, the baffle 222 may be mounted to pivot about the leading edge 224, trailing edge 226 or some point therebetween, or to pivot about a pivot location that is not on the baffle 222, such as the rotation axis of the rear roller 208. It will also be appreciated that one or both of the baffle actuators 414, 416 may be replaced by mechanical linkages or other motion devices. Other alternatives and variations will be apparent to persons of ordinary skill in the art in view of the present disclosure.

The grain cleaning system 200 also may include a clean grain auger, a tailings auger, and other features such as known in the art.

In operation, the threshing and separating system 204 is operated to dispense grain and MOG onto the conveyor belt 202, and the conveyor belt 202 is operated by the motor 210 to drive the grain and MOG towards the baffle 222. In some cases, the leading edge 224 of the baffle 222 may act as a primary separation mechanism to strip off a layer of MOG from the top of the stratified grain and MOG mixture. As the grain passes around the rear roller 208, the baffle 222 (and paddles 234, if used) directs the grain and remaining MOG at least partially downwards (i.e., along a vector path having a downwards vertical component) into the airstream 232 generated by the fan 218. The airstream is directed at least partially upwards (i.e., along a vector path having an upwards vertical component) to contact the oncoming stream of grain and MOG. Such contact separates at least some of the MOG from the grain.

As explained above, the conveyor belt 202, and particularly the paddles 234 may expel the grain and MOG downwards by forcing it through the gap between the conveyor belt 202 and the baffle 222, which is expected to enhance the downwards acceleration of the grain.

As the combine traverses different terrain, one or both of the conveyor belt 202 and the baffle 222 may be actively controlled to change its orientation, either in the fore-aft direction, the lateral direction, or both. Thus, the conveyor belt 202 and baffle 222 may be operated to maintain efficiency during such transient movements of the combine. Any suitable computer controller may be used to actively control the conveyor belt 202 and baffle 222, and such systems are known in the art for controlling grain pans and the like. Thus, there is no need to explain the details of such systems herein.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. A grain cleaning system for a combine, the grain cleaning system comprising:
    a front roller;
    a rear roller spaced in a rearward direction from the first roller;
    a conveyor belt having an upper surface extending from the front roller to the rear roller;
    a motor operatively connected to the conveyor belt and configured to drive the upper surface in a belt travel direction from the front roller to the rear roller;
    a baffle located adjacent the rear roller, the baffle having a leading edge, a trailing edge located behind the leading edge with respect to the belt travel direction and below the leading edge with respect to a vertical direction, and a baffle surface extending from the leading edge to the trailing edge, the baffle positioned adjacent the rear roller such that there is a gap between the conveyor and the baffle sized to accommodate a passage of a combination of grain and material other than grain carried by the conveyor;
    one or more sieves located below the baffle; and
    a fan configured to direct an airflow at least partially upwards in the vertical direction adjacent the rear roller.

2. The grain cleaning system of claim 1, wherein the motor is configured to be operated to drive the combination of grain and material other than grain into contact with the baffle.

3. The grain cleaning system of claim 1, wherein the conveyor belt comprises one or more paddles extending from an outer surface of the conveyor belt.

4. The grain cleaning system of claim 3, wherein the one or more paddles extend a first distance from the outer surface of the conveyor belt, and the baffle is located at its nearest point at a second distance from the outer surface of the conveyor belt, the second distance being greater than the first distance.

5. The grain cleaning system of claim 4, wherein the first distance is between 50% and 95% of the second distance.

6. The grain cleaning system of claim 1, further comprising one or more belt actuators configured to move at least one of the first roller and the second roller in the vertical direction to thereby change the orientation of the belt travel direction.

7. The grain cleaning system of claim 1, further comprising one or more baffle actuators configured to move one or both of the leading edge and the trailing edge in the vertical direction.

8. A method for cleaning grain in a combine, the method comprising:
    operating a conveyor belt to move a combination of grain and material other than grain in a belt drive direction;
    expelling the combination of grain and material other than grain from the conveyor belt in the belt drive direction, the expelling comprising forcing the combination of grain and material other than grain to pass through a gap between an outer surface of the conveyor belt and the baffle;
    contacting the expelled combination of grain and material other than grain with a baffle to force the combination of grain and material other than grain to move at least partially downwards in a vertical direction; and
    directing an airflow at least partially upwards in the vertical direction to intersect the downwardly-directed combination of grain and material other than grain, to thereby separate at least some of the material other than grain from the grain.

9. The method of claim 8, wherein operating the conveyor belt to move the combination of grain and material other than grain comprises pushing the combination of grain and material other than grain with one or more paddles extending from an outer surface of the conveyor belt.

10. The method of claim 9, wherein expelling the combination of grain and material other than grain from the conveyor belt comprises forcing the combination of grain and material other than grain to pass through a gap between the outer surface of the conveyor belt and the baffle, wherein the one or more paddles extend a first distance from the outer surface of the conveyor belt, and a minimum distance of the gap between the outer surface of the conveyor belt and the baffle is greater than the first distance.

11. The method of claim 10, wherein the first distance is between 50% and 95% of the minimum distance.

12. The method of claim 8, further comprising moving at least one part of the conveyor belt relative to another part of the conveyor belt to thereby change the orientation of the belt travel direction.

13. The method of claim 8, further comprising moving the baffle to alter the position of the baffle relative to the belt travel direction.

14. An agricultural combine comprising:
a threshing and separating system; and
a header configured to direct crops into the threshing and separating system;
wherein the threshing and separating system comprises a grain cleaning system comprising:
a front roller;
a rear roller spaced in a rearward direction from the first roller;
a conveyor belt having an upper surface extending from the front roller to the rear roller;
a motor operatively connected to the conveyor belt and configured to drive the upper surface in a belt travel direction from the front roller to the rear roller;
a baffle located adjacent the rear roller, the baffle having a leading edge, a trailing edge located behind the leading edge with respect to the belt travel direction and below the leading edge with respect to a vertical direction, and a baffle surface extending from the leading edge to the trailing edge, the baffle positioned adjacent the rear roller such that there is a gap between the conveyor and the baffle sized to accommodate a passage of a combination of grain and material other than grain carried by the conveyor;
one or more sieves located below the baffle; and
a fan configured to direct an airflow at least partially upwards in the vertical direction adjacent the rear roller.

15. The agricultural combine of claim 14, wherein the motor is configured to be operated to drive the combination of grain and material other than grain into contact with the baffle.

16. The agricultural combine of claim 14, wherein the conveyor belt comprises one or more paddles extending from an outer surface of the conveyor belt.

17. The agricultural combine of claim 16, wherein the one or more paddles extend a first distance from the outer surface of the conveyor belt, and the baffle is located at its nearest point at a second distance from the outer surface of the conveyor belt, the second distance being greater than the first distance.

18. The agricultural combine of claim 13, wherein the first distance is between 50% and 95% of the second distance.

19. The agricultural combine of claim 14, further comprising one or more belt actuators configured to move at least one of the first roller and the second roller in the vertical direction to thereby change the orientation of the belt travel direction.

\* \* \* \* \*